United States Patent [19]

Rice et al.

[11] Patent Number: 4,506,146

[45] Date of Patent: Mar. 19, 1985

[54] WIRE TEMPERATURE CONTROLLER

[75] Inventors: Richard M. Rice, Agusta County; Robert E. Watling, Nelson County, both of Va.; Drew R. Henderson, Ridgefield, Conn.

[73] Assignee: Reynolds Metals Company, Richmond, Va.

[21] Appl. No.: 581,603

[22] Filed: Feb. 21, 1984

Related U.S. Application Data

[63] Continuation of Ser. No. 294,919, Aug. 21, 1981, abandoned.

[51] Int. Cl.$^3$ ............................................. H05B 1/02
[52] U.S. Cl. .................................. 219/499; 323/235; 219/486; 219/501; 219/494; 307/39
[58] Field of Search ............... 219/497, 494, 499, 501, 219/507–510, 483, 486, 505; 307/39–41; 323/235, 236

[56] References Cited

U.S. PATENT DOCUMENTS

| | | | |
|---|---|---|---|
| 3,392,914 | 7/1968 | Nienstaedt | 236/46 |
| 3,617,696 | 11/1971 | Reenstra et al. | 219/501 |
| 3,649,853 | 3/1972 | Kerchner | 219/499 |
| 3,718,924 | 2/1973 | Trubert et al. | 219/499 |
| 3,752,956 | 8/1973 | Cahill | 219/505 |
| 3,789,190 | 1/1974 | Orosy et al. | 219/494 |
| 3,946,200 | 3/1976 | Juodikis | 219/499 |
| 3,947,656 | 3/1976 | Lodi | 219/505 |
| 4,010,412 | 3/1977 | Forman | 219/486 |
| 4,122,719 | 10/1978 | Carlson et al. | 73/342 |
| 4,380,698 | 4/1983 | Butts | 219/486 |

*Primary Examiner*—M. H. Paschall
*Attorney, Agent, or Firm*—Alan T. McDonald

[57] ABSTRACT

A method and apparatus are described for controlling the temperature of a heated wire, such as on a wire sealer for plastic film. Temperature control is based upon measurements of changes in the resistance of the wire as it is heated, through bridge circuit and microprocessor techniques.

7 Claims, 4 Drawing Figures

WIRE TEMPERATURE CONTROLLER

This application is a continuation of Ser. No. 294,919 filed Aug. 21, 1981 now abandoned.

BACKGROUND OF THE INVENTION

Wire sealers are widely used for sealing plastic films in the packaging field. In such sealers, a heated wire is pressed against a pair of film layers and a back-up pad. The film layers are sealed to one another and the composite is cut by the heat and pressure of the wire. Typically, such wires operate at wire temperatures between about 450° F. (232.2° C.) and 700° F. (371.1° C.).

Such sealers may include a single sealing wire. However, most typically, such sealers include a pair of wires to form an L-seal.

A major problem with such wire sealers results from an inability to carefully control the temperature of the wire. Because of this, wire sealers are operated to reach a maximum temperature along a time-temperature response curve, at which time power is cut to the wire and the wire cools. Since accurate temperature control is impossible, these sealers must operate at maximum wire temperatures far above that necessary for film sealing. Plastics films may commonly be sealed at film temperatures between about 350° F. (176.7° C.) and 450° F. (232.2° C.).

When films are subjected to temperatures in excess of their sealing temperatures, the films produce smoke and resin build-up on the wire and the back-up pad. This build-up, along with the higher than necessary temperatures, result in quick degradation of the wire and back-up pad. The smoke is an environmentally objectionable occurance.

Thus, it is a major objective of the present invention to carefully control the wire temperature in a wire sealer. This results in an ability to seal at lower wire temperatures than previously possible, substantially reducing or eliminating smoke and build-up during the sealing operation.

THE PRESENT INVENTION

By means of the present invention, these desired results are obtained. The present invention comprises a method and apparatus for controlling the temperature of a heated wire in which a microprocessor is employed to monitor the temperature of the heated wire and control electrical power supplied to the wire. The mechanism for the monitoring and control is measurement, through bridge circuit techniques, of changes in the resistance of the heated wire, with these changes corresponding to temperature changes of the wire. In one embodiment, a single wire is monitored and controlled. In a modified embodiment a pair of wires, as would be commonly employed in an L-sealer, are individually monitored and controlled.

BRIEF DESCRIPTION OF THE DRAWINGS

The present invention will be more fully described with reference to the drawings, in which.

DETAILED DESCRIPTION OF THE PREFERRED EMBODIMENTS

Figure 1:
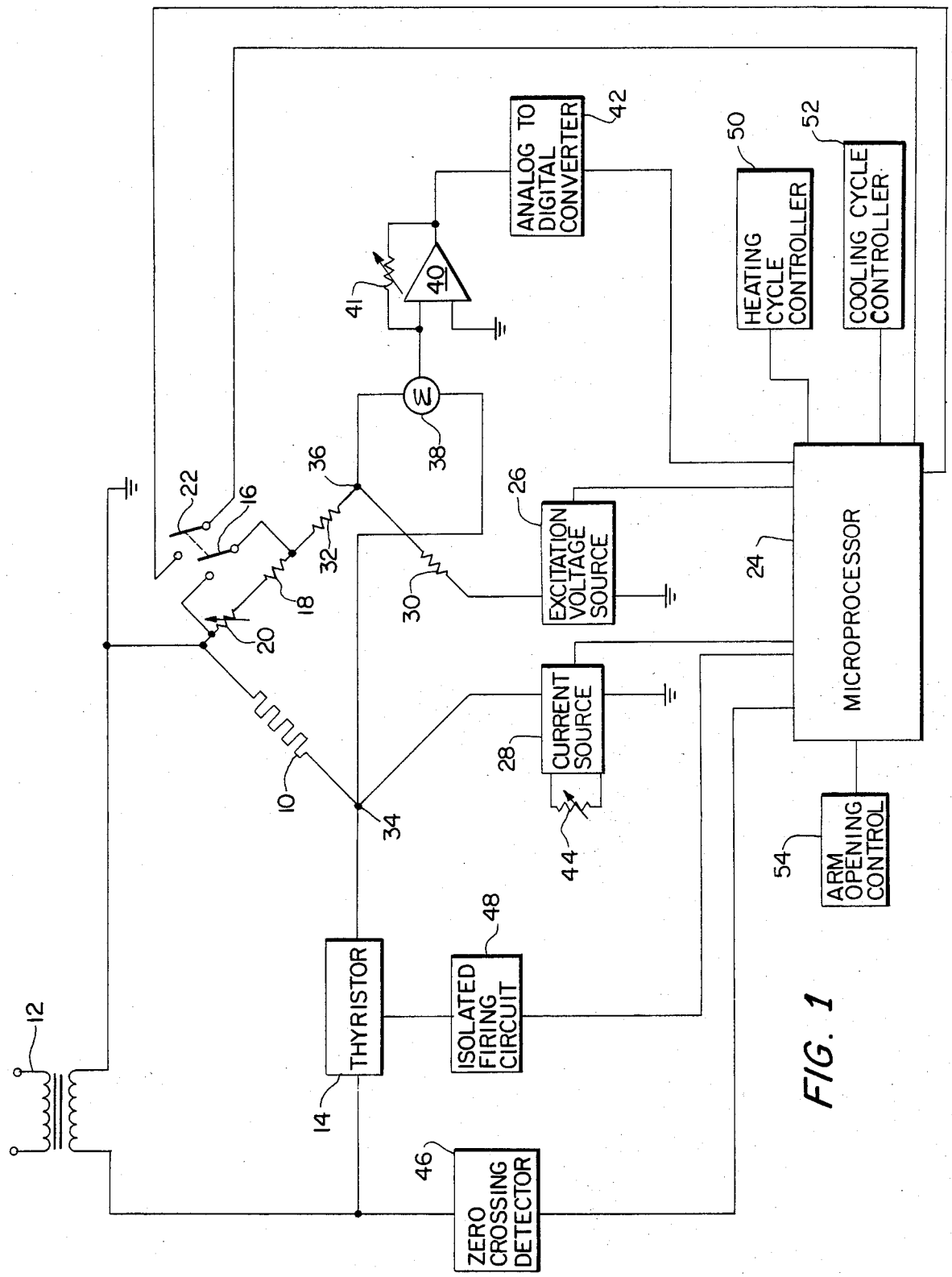
FIG. 1 is a block schematic circuit illustrating the monitoring and control of a single wire.

Turning to FIG. 1, a heated wire 10, which forms a portion of heat sealing apparatus (not shown) is controlled by the system of the present invention. The wire 10 is selected for its substantial positive temperature coefficient, high resistivity and good corrosion resistence. Typical of the materials forming this wire 10 include such nickel-chromium alloys as Nichrome®I, Nichrome®V, Chromel®A, Chromel®D, Tophet®A and Tophet®D.

The wire 10 may be a bare wire or may include a coating thereon, for improved release and increased temperature coefficient. The coating may be formed, for example, of porus gold or nickel, with a fluorocarbon impregnation.

The wire 10 is electrically connected to a source of alternating current electrical power, such as transformer 12. The transformer 12 is also a part of the sealer. Transformer 12 typically supplies between about 40 and 100 volts AC. Typically, power is supplied to wire 10 by transformer 12 when a switch is closed on the sealer, activating transformer 12. In the present invention, however, an electronic switching mechanism, such as a thyristor 14, is interposed in the wire 10-transformer 12 circuit.

Thyristor 14 may be an SCR, a triac, a gated diode bridge or other similar electronic switch. It is the control of this switch 14 which controls the power input to wire 10.

Prior to operation of the system, an electrical bridge containing wire 10 is balanced at room temperature. Switch 16 is closed, removing resistors 18 and 20 from the circuit and closing switch 22. A microprocessor 24 senses the closing of switch 22 and activates bridge excitation voltage source 26 and current source 28. Microprocessor 24 may be a microcomputer having an internal ROM and RAM memories and crystal control, or it may be a microprocessor having its crystal control and ROM memory connected externally. A suitable microprocessor is an Intel model 8035 microprocessor having a 2716 16K ROM and a 6 MHz crystal connected externally. Voltage source 26 supplies a positive direct current voltage to the high impedance side of the bridge, though resistors 30 and 32. Current source 28 supplies a negative direct current to the low impedance side of the bridge, though wire 10. Of course, the direct voltage and current directions could be reversed.

The voltages at detector corners 34 and 36 of the bridge are measured. A summing junction 38 adds the voltages at detector corners 34 and 36 and supplies the net voltage to amplifier 40, which amplifier 40 has its gain adjusted by variable resistor 41, as will be further explained below. The amplified net voltage is passed to an anolog to digital converter (ADC) 42, where the voltage signal is converted to a digital input to microprocessor 24, which then outputs the voltage to a light signal or meter (not shown). Of course, the illustrated bridge could be replaced with a more traditional Wheatstone bridge, with no current supply, but with a variable resistor in the bridge. In that case, the amplifier 40 would be a differential amplifier and would send microprocessor 24 a signal of the voltage difference between detector corners 34 and 36.

Variable resistor 44 is manually adjusted until the sum of the voltages at points 34 and 36 is zero. At this point the system is balanced and ready for operation and switches 16 and 22 are opened, placing resistors 20 and 18 into the bridge circuit.

When switch 16 is opened, the bridge once again is unbalanced. As wire 10 is heated, its resistance increases, bringing the bridge back to balance at the temperature set point. This is the basic mechanism for temperature control in the system.

The temperature set point is determined by resistors 18 and 20. The resistor 18 is a fixed resistance resistor and sets a minimum set point temperature for the system, with any higher set point temperature being determined by changing the resistance of variable resistor 20.

To begin operation, the arm of the sealer is closed activating transformer 12. If the heated wire 10 were not a part of a sealer, another activation signal for the given system would be given to transformer 12. Microprocessor 24 then looks to zero crossing detector (ZCD) 46. When ZCD 46 sees zero voltage between transformer 12 and thyristor 14, a typical control cycle is initiated, the microprocessor 24 now being assured that a new alternating current half cycle has begun.

Figure 2:
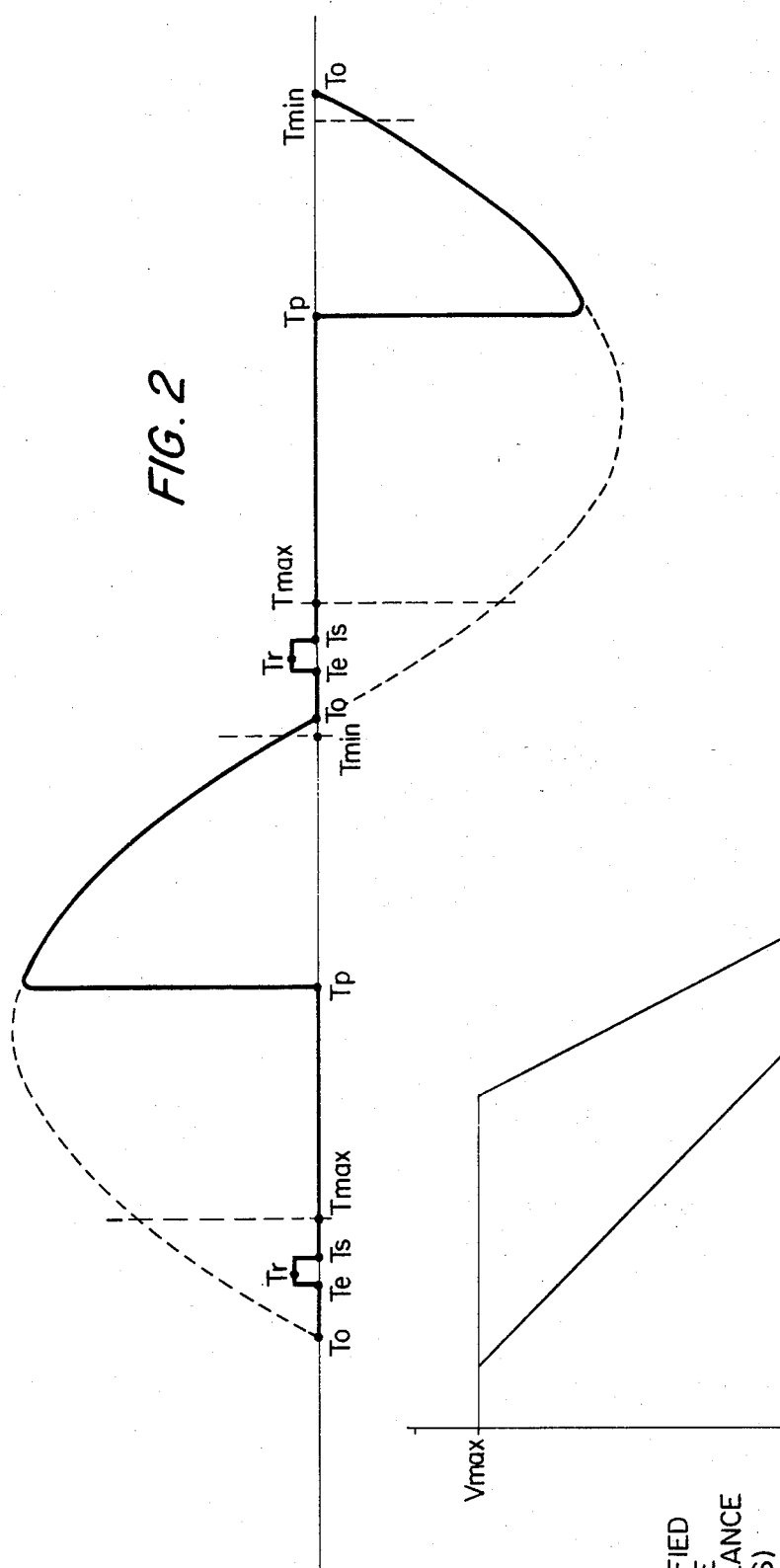
FIG. 2 is a graph illustrating power inputs to the circuit during a single electrical cycle of alternating current.

FIG. 2 illustrates the time sequence of two consecutive control cycles, each occurring during either a positive or a negative voltage half cycle. As illustrated, a positive voltage half cycle is followed by a negative voltage half cycle. Of course, these half cycles could be reversed. The ZCD 46 indicates time To to microprocessor 24. After a small interval, for reasons which will be more fully described below, the microprocessor 24 activates excitation voltage source 26 and current source 28 at time Te. After giving these sources a chance to settle, the microprocessor 24 reads the net voltage from amplifier 40 in the manner previously recited at time Tr and shuts down the excitation voltage source 26 and current source 28 at time Ts.

Figure 3:
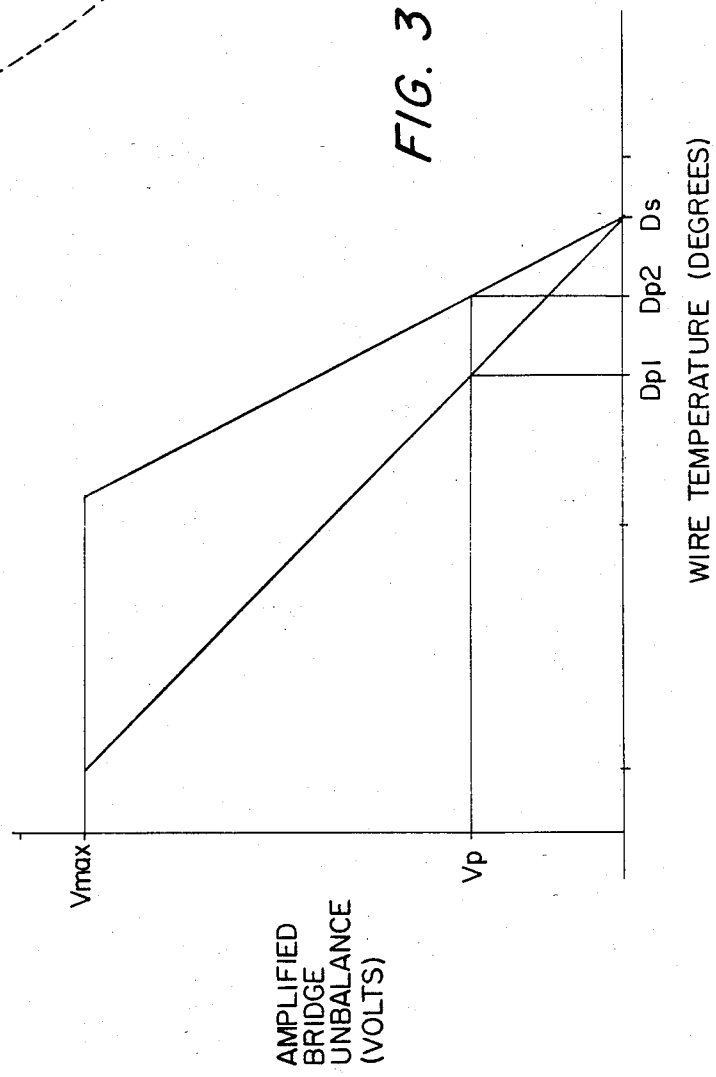
FIG. 3 is a graph illustrating the monitoring bridge output voltage versus wire temperature.

At this point, the gain on amplifier 40 becomes important. Looking at FIG. 3, the output of amplifier 40 is plotted. Amplifier 40 has a maximum voltage output Vmax. Should the voltage at summing point 38 exceed this voltage, amplifier 40 will supply voltage Vmax to microprocessor 24, protecting microprocessor 24 from damage. The microprocessor 24 is programmed to provide maximum available power during the alternating current half cycle to wire 10 as long as the voltage from amplifier 40 exceeds Vp. When the voltage falls below Vp, the microprocessor 24 selects a reduced power level. This power level is determined by dividing the difference between the set point temperature Ds and the minimum proportional band temperature Dp into a number, i.e., 64, of intervals. Thus, as the gain or amplifier 40 is increased, the proportional band is reduced, giving maximum power to the wire 10 over a larger temperature range, and a finer control of power supply within the now smaller proportional band. The gain on amplifier 40 should be as high as possible, without causing instability of the control system.

As previously mentioned, microprocessor 24 has received a voltage input from amplifier 40. If this voltage is above Vp, maximum available power is supplied to wire 10. This is accomplished by firing thyristor 14 at time Tmax. As illustrated, time Tmax supplies approximately 89.71% of the available power in the half cycle. Of course, if time Tmax is permitted to occur earlier, higher powers may be provided, but phase shift tolerance is reduced. The firing point for thyristor 14 may be at any time Tp between Tmax and Tmin. Tmax is selected to permit time for the monitoring functions to occur. Tmin is selected to assure that firing occurs before the next zero crossing, in spite of slight phase shifts or timing errors. As illustrated, time Tmin supplies approximately 0.12% of the available power in the half cycle.

The firing points below Tmax are determined by the slope of the amplifier gain below Vp, and by dividing voltages below Vp into segments, which become registers in microprocessor 24, i.e., 64 individual firing points Tp, each providing a power between Tmax and Tmin of the available power in the half cycle.

To fire thyristor 14, microprocessor 24, at the time Tp selected from its voltage input from amplifier 40, activates an isolated firing circuit 48, to prevent the voltages around thyristor 14 from reaching microprocessor 24 and to assure that thyristor 14 receives the proper gating voltage and current. When thyristor 14 is closed, power is supplied to wire 10 from transformer 12 for the remainder of the alternating current half cycle.

When a new half cycle begins, the zero voltage at the thyristor 14 opens thyristor 14, ending power flow to wire 10 and initiating a new control sequence. Clearly, the number of control cycles per second is equal to twice the frequency of the alternating current.

Control continues until the temperature of the wire 10 reaches set point temperature Ds. Typically, in a wire sealer, this will occur in about 0.025 to 0.125 seconds. When the wire 10 reaches a temperature between Ds and Dp, i.e., is within the proportional band, microprocessor 24 begins to count half cycles and, after reaching a specific number of half cycles, i.e., as manually set in heating cycle controller 50, suspends power to wire 10.

Optionally, the microprocessor 24 may count additional half cycles after reaching the number set in heating cycle controller 50, as manually set in cooling cycle controller 52, to signal an arm opening device 54, permitting the seal bar of the sealer having wire 10 therein to be raised at a precise time.

Figure 4:
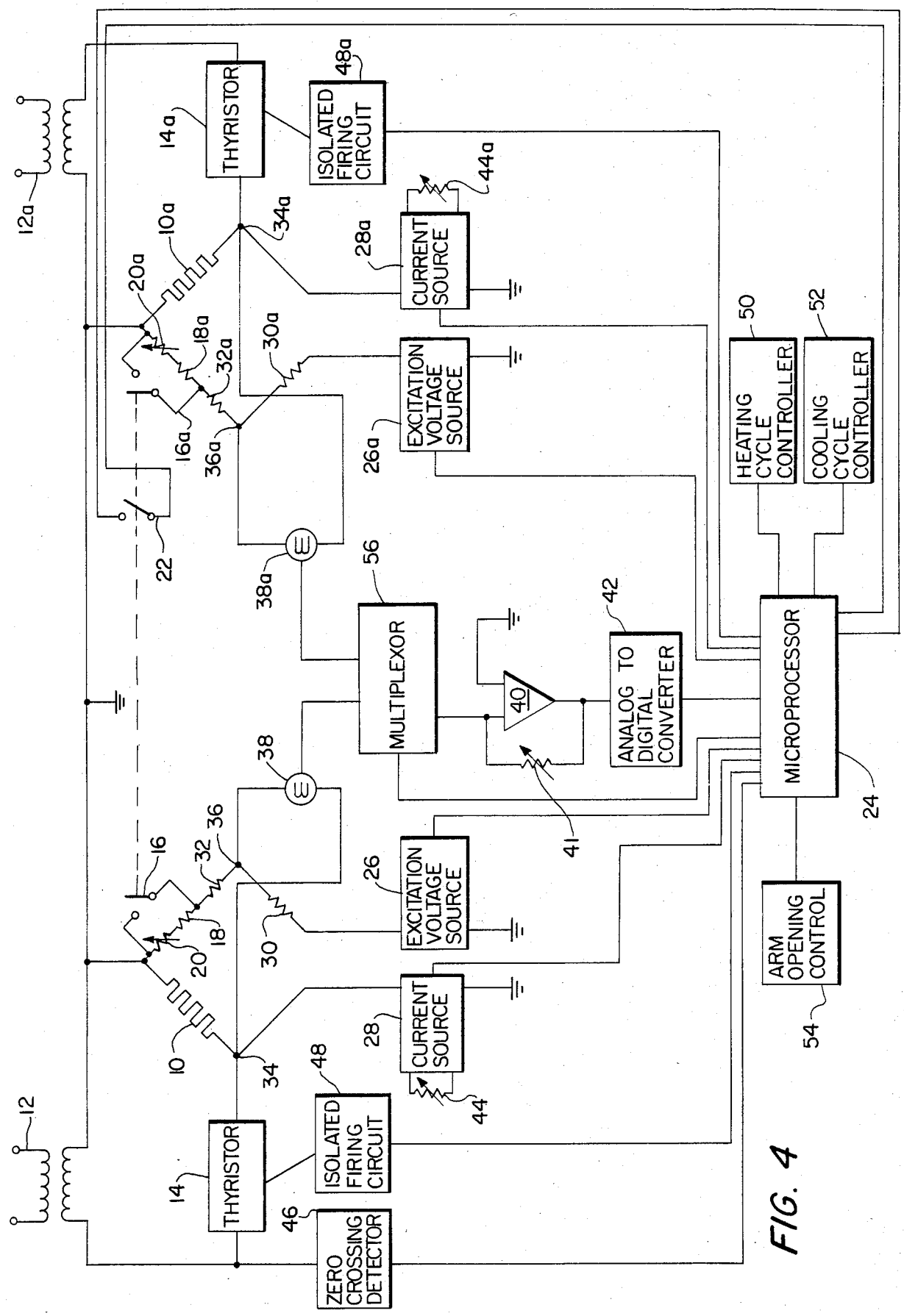
FIG. 4 is a block schematic circuit illustrating the monitoring and control of a pair of wires.

A modified form of the control mechanism is illustrated in FIG. 4. In this circuit, two separate wires 10 and 10a are controlled by the microprocessor 24. Of course, three or more wires could be controlled in the same manner. Identical elements of the control circuit for wire 10a have been given the same numerals as in FIG. 1, with the addition of the letter "a".

Balancing of the system is the same as described above, balancing occuring by manually setting variable resistors 44 and 44a for their corresponding bridges.

Excitation voltage source 26a could be eliminated, with excitation voltage for both bridges being supplied by excitation voltage source 26. However, separate current source 28a is required, due to variable resistor 44a balancing this bridge.

During a control cycle, one major difference occurs. The micropressor 24 sequentially reads the summing points of the two bridges by switching the signal received by amplifier 40. This is accomplished by control of multiplexor 56, which receives summing point voltages from both bridges from separate inputs and provides the requested output to amplifier 40. Thus, in this embodiment, there are two Tr times, one for each bridge, and two separate Tp times, one for each wire 10 and 10a. The Tp times for the two wires are not necessarily equal and are independently calculated by microprocessor 24.

The voltage supplies 12 and 12a may be separate windings of a single transformer, or they may be separate power sources. One important aspect of the power supplies is that their phase difference be small. It is important that the phase of transformer 12a not lag the phase of transformer 12 by more than the time from To to Te. It is also important that the phase of transformer 12a not lead the phase of transformer 12 by more than the time from Tmin to To. It is the need for delay to permit these phase shifts that determine Tmax and Tmin, thus limiting the maximum and minimum power available during a voltage half cycle.

If two wires are controlled, microprocessor 24 does not begin to count the half cycles called for by heating cycle controller 50 until both wires 10 and 10a have reached a proportional band temperature.

From the foregoing, it is clear that the present invention provides an accurate and high speed control of heated wire temperatures.

While the invention has been described with reference to certain specific embodiments thereof, it is not intended to be so limited thereby, except as set forth in the accompanying claims.

We claim:

1. An apparatus for controlling the temperature of an electrically heated wire comprising an alternating current voltage power supply in a circuit with said wire, said circuit comprising a zero crossing detector for determining each zero crossing of said alternating current voltage power supply, a bridge circuit containing said wire, means for electrically exciting said bridge circuit in response to each zero crossing of said alternating current voltage power supply, said means for electrically exciting comprising a voltage supply for a high impedance side of said bridge circuit and a current supply of opposite polarity to said voltage supply for a low impedance side of said bridge circuit, means for measuring the voltage at a pair of detector corners of said bridge circuit comprising a summing junction, a thyristor and a firing circuit for said thyristor for electrically connecting said wire and said alternating current voltage power supply in response to the summed voltage of said detector corners of said bridge circuit and a microprocessor for controlling said means for exciting in response to each zero crossing of said alternating current voltage supply and for controlling said firing circuit and said thyristor in response to the summed voltage of said detector corners of said bridge circuit.

2. The apparatus of claim 1 wherein said means for measuring the voltage at said pair of detector corners further comprises an amplifier.

3. The apparatus of claim 1 further comprising a heating cycle controller for maintaining a set point temperature for a preselected number of alternating current half cycles after reaching said set point temperature.

4. The apparatus of claim 3 further comprising a cooling cycle controller for preventing power supply to said wire for a predetermined number of alternating current half cycles after said heating cycle controller has deactivated.

5. The apparatus of claim 1 further comprising a second electrically heated wire, a second alternating current voltage power supply, a second bridge circuit containing said second wire, means for electrically exciting said second bridge circuit in response to each zero crossing of said alternating current voltage power supply, said means for electrically exciting said second bridge circuit comprising a second voltage supply for a high impedance side of said second bridge circuit and a second current supply of opposite polarity to said second voltage supply for a low impedance side of said second bridge circuit, means for measuring the voltage at a second pair of detector corners of said bridge circuit comprising a second summing junction and a second thyristor and a second firing circuit for said second thyristor for electrically connecting said second wire and said second alternating current voltage power supply in response to the summed voltage of said second detector corners of said second bridge circuit, said microprocessor controlling said second means for electrically exciting in response to each zero crossing of said alternating current voltage power supply and controlling said second firing circuit and said second thyristor in response to the summed voltage of said second detector corners of said second bridge circuit.

6. The apparatus of claim 5 wherein said voltage supply and said second voltage supply are a common voltage supply source.

7. The apparatus of claim 5 wherein said means for measuring the voltage at said pair of detector corners and said means for measuring the voltage at said second pair of detector corners further comprises a multiplexor and an amplifier.

* * * * *